United States Patent [19]
Fujii

[11] Patent Number: 5,663,628
[45] Date of Patent: Sep. 2, 1997

[54] BATTERY SYSTEM WITH LEVELLED DISCHARGE

[75] Inventor: Takashi Fujii, Katano, Japan

[73] Assignee: Ueda Co., Ltd., Osaka, Japan

[21] Appl. No.: 504,313

[22] Filed: Jul. 20, 1995

[30] Foreign Application Priority Data

Sep. 8, 1994 [JP] Japan ................... 6-242071

[51] Int. Cl.$^6$ ..................................... H02J 7/04
[52] U.S. Cl. .............................. 320/1; 320/13; 320/14
[58] Field of Search ........................... 320/1, 3, 5, 8, 320/9, 13, 14, 25, 40, 51, 54, 55, 61; 136/291, 293

[56] References Cited

U.S. PATENT DOCUMENTS

| | | | |
|---|---|---|---|
| 4,963,811 | 10/1990 | Weber | 320/1 |
| 5,041,776 | 8/1991 | Shirata et al. | 320/1 |
| 5,119,010 | 6/1992 | Shirata et al. | 320/61 X |

FOREIGN PATENT DOCUMENTS

| | | |
|---|---|---|
| 41 03 697 A1 | 8/1992 | Germany . |
| 677048 A5 | 3/1991 | Switzerland . |
| 2 275 378 | 8/1994 | United Kingdom . |
| WO 88/10529 | 12/1988 | WIPO . |

OTHER PUBLICATIONS

International Search Report, Dec. 1995.

*Primary Examiner*—Edward Tso
*Attorney, Agent, or Firm*—Nikaido, Marmelstein, Murray & Oram LLP

[57] ABSTRACT

A battery system for supplying electric energy from a primary battery or a secondary battery to a load. This system includes a battery consisting of the primary battery or the secondary battery, an electric double layer capacitor for storing electric energy from the battery, a limiting resistor for limiting the electric energy supplied from the battery to the electric double layer capacitor, and a discharge controller for controlling the electric double layer capacitor. The discharge controller causes the electric double layer capacitor to discharge the electric energy to the load intermittently in predetermined cycles while charging the electric double layer capacitor. A discharging time for discharging the electric energy from the electric double layer capacitor to the load is shorter than a charging time for charging the electric double layer capacitor with electric energy. At this time, a discharge current is greater than a charge current.

20 Claims, 8 Drawing Sheets

BATTERY SYSTEM WITH LEVELLED DISCHARGE

BACKGROUND OF THE INVENTION

1. Field of the Invention

This invention relates to a battery system for supplying a load with electric energy from a battery, and to an intermittent motion apparatus using this system for intermittently driving the load.

2. Description of the Related Art

Conventional battery systems of this type include a battery system for supplying electric energy from a primary battery or secondary battery to a load (hereinafter referred to as a first battery system), and a battery system for charging a secondary battery with electric energy from a solar battery, and supplying the electric energy from the secondary battery to a load (hereinafter referred to as a second battery system).

Such conventional systems have the following drawbacks.

Generally, the battery including a primary battery or secondary battery used in the first battery system generates electric energy by a chemical reaction such as an oxidation reduction reaction. This system has the following characteristics.

In the case of a primary battery, with an increase in electric energy discharged, i.e. discharge electric current, the chemical reaction becomes intense to expedite deterioration of an internal electrode material and the like, resulting in a reduced time for discharge (duration). Moreover, a discharge current exceeding a certain value causes a sharp drop in the duration.

In the case of a secondary battery, as in the primary battery, its duration reduces sharply in proportion to the discharge electric current. The number of times the secondary battery is used in charging and discharging (cycle times) reduces with an increase in the depth of discharge (relating to the ratio of discharge current to the nominal capacity of the secondary battery).

SUMMARY OF THE INVENTION

This invention has been made having regard to the state of the art noted above, and its object is to provide a battery system which, by leveling discharge electric current from a battery to a load, has an extended duration of a primary battery or secondary battery, with the secondary battery having increased cycle times, and an intermittent motion apparatus using this battery system.

The above object is fulfilled, according to a first aspect of this invention, by a battery system for supplying electric energy from a primary battery or a secondary battery to a load, comprising:

a battery consisting of the primary battery or the secondary battery;

an electric double layer capacitor for storing electric energy from the battery;

a limiting resistor for limiting the electric energy supplied from the battery to the electric double layer capacitor; and a discharge controller for causing the electric double layer capacitor to discharge the electric energy to the load intermittently in predetermined cycles while charging the electric double layer capacitor, such that a discharging time for discharging the electric energy from the electric double layer capacitor to the load is shorter than a charging time for charging the electric double layer capacitor with electric energy and that a discharge current is greater than a charge current.

When the electric double layer capacitor charged by the battery discharges electric energy to the load, the discharge controller supplies a discharge current greater than a charge current to the load intermittently in predetermined cycles, with a discharging time shorter than a charging time. Consequently, the battery charges the electric double layer capacitor with a small current for a long time. At this time, the charge current (i.e. discharge current from the battery) is smoothed by the limiting resistor and electric double layer capacitor, thereby leveling the discharge current to the load as seen from the battery. Further, the electric energy for charging the electric double layer capacitor (charging time X charging current) and the electric energy discharged therefrom (discharging time X current discharged) are equal. Consequently, the time for charging the electric double layer capacitor may be extended by shortening the discharging time of the electric double layer capacitor. This makes it possible to increase power supplied to the load in one cycle of intermittent operation.

In this way, the discharge controller effects controls to make the time for discharge from the electric double layer capacitor to the load shorter than the time for charging the electric double layer capacitor by the battery, thereby extending the time for the battery to charge the electric double layer capacitor. At this time, the charge current from the battery to the electric double layer capacitor is smoothed by the limiting resistor and electric double layer capacitor, which levels the discharge current from the battery to the load. This realizes an extended duration of the battery to secure a long life thereof.

Preferably, the discharge controller provides controls such that, where the discharging time is $T_1$, the charging time is $T_2$, and a sum thereof is a driving cycle $T$ ($=T_1+T_2$) of the load, the discharging time $T$ is 1% of the driving cycle $T$ of the load (duty ratio $K=0.01$).

It is also preferred that the battery comprises a secondary battery chargeable by a solar battery for converting light energy into electric energy.

In the above construction, the electric double layer capacitor is charged by the secondary battery which is in turn charged by the solar battery. When the electric double layer capacitor discharges electric energy to the load, the discharge controller supplies a discharge current greater than a charge current to the load intermittently in predetermined cycles, with a discharging time shorter than a charging time. Consequently, the battery charges the electric double layer capacitor with a small current for a long time. At this time, the charge current (i.e. discharge current from the battery) is smoothed by the limiting resistor and electric double layer capacitor, thereby leveling the discharge current to the load as seen from the battery. That is., the secondary battery has a reduced depth of discharge. Further, the electric energy for charging the electric double layer capacitor (charging time X charging current) and the electric energy discharged therefrom (discharging time X current discharged) are equal. Consequently, the time for charging the electric double layer capacitor may be extended by shortening the discharging time of the electric double layer capacitor. This makes it possible to increase power supplied to the load in one cycle of intermittent operation.

In this way, the discharge controller effects controls to make the time for discharge from the electric double layer capacitor to the load shorter than the time for charging the electric double layer capacitor by the secondary battery, thereby extending the time for the secondary battery to charge the electric double layer capacitor. At this time, the charge current from the secondary battery to the electric double layer capacitor is smoothed by the limiting resistor and electric double layer capacitor, which levels the discharge current from the secondary battery to the load. That is, the depth of discharge is reduced. This realizes an extended duration of the secondary battery and increased cycle times of the secondary battery to secure a long life thereof.

Preferably, the battery system according to this invention further comprises a reverse current preventive diode connected in series between the solar battery and the secondary battery.

In a cloudy condition, for example, the solar battery may have an electromotive force less than a voltage at the opposite ends of the secondary battery. The above diode than acts to prevent a reverse current flowing from the secondary battery to the solar battery. Thus, the electric energy stored in the secondary battery may be supplied to the load (through the electric double layer capacitor) with no waste.

It is preferred that the reverse current preventive diode comprises a schottky diode.

An ordinary diode has a forward voltage [$V_F$] as high as 0.6 V, whereas a schottky diode has a forward voltage in the order of 0.3 V to suppress a decrease in the voltage generated by the solar battery. As a result, the electric energy generated by the solar battery may be applied to the electric double layer capacitor without waste.

Preferably, the discharge controller provides controls such that, Where the discharging time is $T_1$, the charging time is $T_2$, and a sum thereof is a driving cycle T ($=T_1+T_2$) of the load, the discharging time T is 5% of the driving cycle T of the load (duty ratio K=0.05).

In a further aspect of the invention, there is provided an intermittent motion apparatus for supplying electric energy from a primary battery or a secondary battery to a load to drive the load intermittently, the apparatus comprising:

a battery consisting of the primary battery or the secondary battery;

a light emitting device such as a light emitting diode acting as the load;

an electric double layer capacitor for storing electric energy from the battery;

a limiting resistor for limiting the electric energy supplied from the battery to the electric double layer capacitor; and a discharge controller for causing the electric double layer capacitor to discharge the electric energy to the light emitting device to drive the light emitting device intermittently in predetermined cycles while charging the electric double layer capacitor, such that a discharging time for discharging the electric energy from the electric double layer capacitor to the light emitting device is shorter than a charging time for charging the electric double layer capacitor with electric energy and that a discharge current is greater than a charge current.

When the electric double layer capacitor charged by the battery discharges electric energy to the light emitting device, the discharge controller supplies a discharge current greater than a charge current to the light emitting device intermittently in predetermined cycles, with a discharging time shorter than a charging time. Consequently, the battery charges the electric double layer capacitor with a small current for a long time. At this time, the charge current (i.e. discharge current from the battery) is smoothed by the limiting resistor and electric double layer capacitor, thereby leveling the discharge current to the light emitting device as seen from the battery. Further, the electric energy for charging the electric double layer capacitor (charging time X charging current) and the electric energy discharged therefrom (discharging time X current discharged) are equal. Consequently, the time for charging the electric double layer capacitor may be extended by shortening the discharging time of the electric double layer capacitor. This makes it possible to increase power supplied to the light emitting device in one cycle of intermittent operation.

In this way, the discharge controller effects controls to make the time for discharge from the electric double layer capacitor to the light emitting device shorter than the time for charging the electric double layer capacitor by the battery, thereby extending the time for the battery to charge the electric double layer capacitor. At this time, the charge current from the battery to the electric double layer capacitor is smoothed by the limiting resistor and electric double layer capacitor, which levels the discharge current from the battery to the light emitting device. This realizes an extended duration of the battery to secure a long life thereof.

In a preferred embodiment of the invention, the apparatus is a signal/guide light including a tubular indicator having a plurality of light emitting diodes arranged peripherally thereof to act as the light emitting device, a grip disposed below the indicator and having the electric double layer capacitor, the limiting resistance and the discharge controller mounted therein, a switch disposed peripherally thereof for supplying and stopping the electric energy from the electric double layer capacitor to the discharge controller, and the battery mounted in a space closable by a watertight cap attached to a bottom thereof, and a protective cover for surrounding the indicator.

In the signal/guide light having the above construction (to draw motorists' attention at nighttime), the discharge controller provides controls to extend life of the battery. This eliminates wasteful battery changing, to reduce adverse influences on environment. The extended battery life results in an economic advantage.

Preferably, the discharge controller provides controls such that, where the discharging time is $T_1$, the charging time is $T_2$, and a sum thereof is a driving cycle T ($=T_1+T_2$) of the light emitting device, the discharging time T is 20% of the driving cycle T (duty ratio K=0.2).

It is preferred that the apparatus further comprises a vibration detecting device for detecting vibration, and a light detecting device for detecting ambient illuminance below a predetermined illuminance level, wherein the discharge controller is operable, only when the vibration detecting device and the light detecting device are both in operation, for causing the electric double layer capacitor to discharge the electric energy to the light emitting device to drive the light emitting device intermittently in predetermined cycles while charging the electric double layer capacitor, such that the discharging time for discharging the electric energy from the electric double layer capacitor to the light emitting device is shorter than the charging time for charging the electric double layer capacitor and that the discharge current is greater than the charge current.

It is only when the vibration detecting device and the light detecting device are both in operation that the electric double layer capacitor charged by the battery discharges electric energy to the light emitting device. At this time, the discharge controller supplies a discharge current greater than a charge current to the light emitting device intermittently in predetermined cycles, with a discharging time shorter than a charging time. This makes it possible to increase power supplied to the light emitting device in one cycle of intermittent operation. The light emitting device is operable intermittently only when the vibration detecting device and the light detecting device are both in operation, which suppresses the discharge from the electric double layer capacitor and charging of the electric double layer capacitor by the battery (i.e. the discharge current from the battery). This results in an advantage of checking exhaustion of the battery.

In another preferred embodiment of the invention, the apparatus is a bicycle safety light including a main body having a light emitting diode mounted in a front position thereof to act as the light emitting device, and a photoconductive cell disposed on an upper surface thereof to act as the light detecting device, the main body containing the electric double layer capacitor, the limiting resistor, the vibration detecting device and the discharge controller, and a light diffuser lens for forwardly and laterally diffusing light radiating from the light emitting diode.

In the bicycle safety light having the above construction (to assure safety of bicycle running at nighttime), the discharge controller provides controls to extend life of the battery. The light emitting diode is lit only when the vibration detecting device and the photoconductive cell are in operation. Thus, the light emitting diode is automatically lit without turning on a power switch when riding the bicycle in a low illuminance condition. The power is automatically cut when the bicycle stops running. This eliminates a wasteful consumption of the battery resulting from the cyclist forgetting to turn off the power switch.

Preferably, the photoconductive cell comprises a CdS (Cadmium sulphide) cell.

The cadmium sulphide cell has spectral response characteristics close to visual sensitivity characteristics. Thus, the light emitting diode may be lit and put out according to the light and darkness perceivable by humans.

It is preferred that the apparatus further comprises an electrolytic capacitor connected to the electric double layer capacitor through the vibration detecting device, wherein the discharge controller is operable, when the vibration detecting device is inoperative and the light detecting device is operative, for causing the electric double layer capacitor to supply electric energy to the light emitting diode intermittently in predetermined cycles for a period according to a capacitance of the electrolytic capacitor.

When the vibration detecting device is inoperative, e.g. when in a low ambient light condition the bicycle stops at traffic lights, the light emitting diode emits light intermittently in predetermined cycles for a time corresponding to the capacitance of the electrolytic capacitor. Thus, safety is assured when the cyclist waits at traffic lights at nighttime.

Preferably, the light diffuser lens is centrally recessed at one end thereof to define two slant surfaces extending toward a bottom, the light emitting diode being embedded in the other end of the light diffuser lens to be opposed to the bottom.

Light radiating from the light emitting diode travels forward through the bottom of the light diffuser lens, with part thereof reflected by the slant surfaces to travel sideways. The light traveling not only in the direction of emission from the light emitting diode, but in directions perpendicular thereto, enhances safety of bicycle running.

Preferably, the discharge controller provides controls such that, where the discharging time is $T_1$, the charging time is $T_2$, and a sum thereof is a driving cycle T $(=T_1+T_2)$ of the light emitting device, the discharging time T is 5% of the driving cycle T of the light emitting device (duty ratio K=0.05).

The apparatus according to this invention may further comprise a seawater detecting device for detecting a presence or absence of seawater, wherein the discharge controller is operable, only when the seawater detecting device detects seawater, for causing the electric double layer capacitor to discharge the electric energy to the light emitting device to drive the light emitting device intermittently in predetermined cycles while charging the electric double layer capacitor, such that the discharging time for discharging the electric energy from the electric double layer capacitor to the light emitting device is shorter than the charging time for charging the electric double layer capacitor and that the discharge current is greater than the charge current.

It is only when the seawater detecting device is in operation that the electric double layer capacitor charged by the battery discharges electric energy to the light emitting device. At this time, the discharge controller supplies a discharge current greater than a charge current to the light emitting device intermittently in predetermined cycles, with a discharging time shorter than a charging time. Consequently, the battery charges the electric double layer capacitor with a small current for a long time. At this time, the charge current (i.e. discharge current from the battery) is smoothed by the limiting resistor and electric double layer capacitor, thereby leveling the discharge current to the light emitting device as seen from the battery. The light emitting device is operable intermittently only when the seawater detecting is in operation, which suppresses the discharge from the electric double layer capacitor and charging of the electric double layer capacitor by the battery (i.e. the discharge current from the battery). This results in an advantage of Checking exhaustion of the battery.

Preferably, the discharge controller provides controls such that, where the discharging time is $T_1$, the charging time is $T_2$, and a sum thereof is a driving cycle T $(=T_1+T_2)$ of the light emitting device, the discharging time T is 5% of the driving cycle T of the light emitting device (duty ratio K=0.05).

It is preferred that the seawater detecting device includes two electrodes each approximately 5 mm square in size and arranged at an interval of about 5 mm.

With the seawater having the above construction, the resistance between the electrodes is about 1 mega ohm in air but about 10 kilo ohms in seawater. This difference in resistance enables detection of seawater.

Preferably, the electrodes are given anticorrosion treatment.

The anticorrosion treatment will protect the electrodes from corrosion by seawater, thereby avoiding variations in the resistance thereof to enable the seawater detecting device to be used over a long period.

In a preferred embodiment, this apparatus is an underwater fishing light including an upper portion and a lower portion having the electric double layer capacitor, the limiting resistor, the seawater detecting device and the discharge controller mounted therein, and a fishing line connector formed at an upper end thereof, and a lower portion connected to the upper portion and having a light emitting diode mounted therein to act as the light emitting device, a plurality of fish hooks arranged peripherally thereof, and a fishing line connector formed at a lower end thereof.

In the underwater fishing light having the above construction (to attract fish living in relatively deep levels), the discharge controller provides controls to extend life of the battery. Further, the light emitting diode is lit only when the seawater detecting device is in operation, i.e. only when the seawater fish light is immersed in seawater. Thus, the battery is slowly consumed, thereby providing an economic advantage.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

DETAILED DESCRIPTION OF THE PREFERRED EMBODIMENTS

Preferred embodiments of this invention will be described in detail hereinafter with reference to the drawings.

Figure 1:
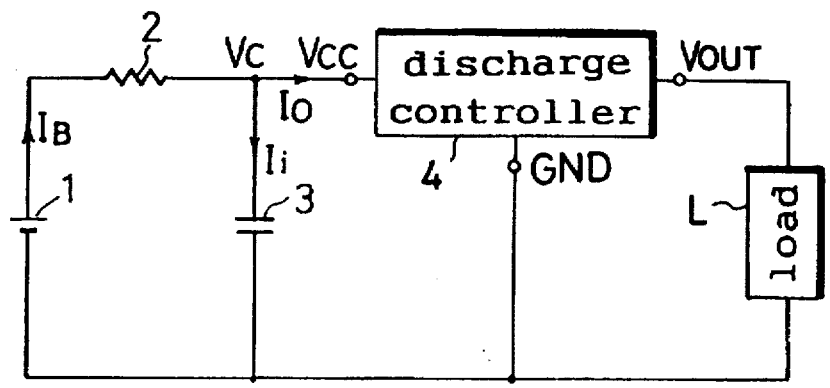
FIG. 1 is a circuit diagram of a battery system in a first embodiment of this invention.
Figure 2A:
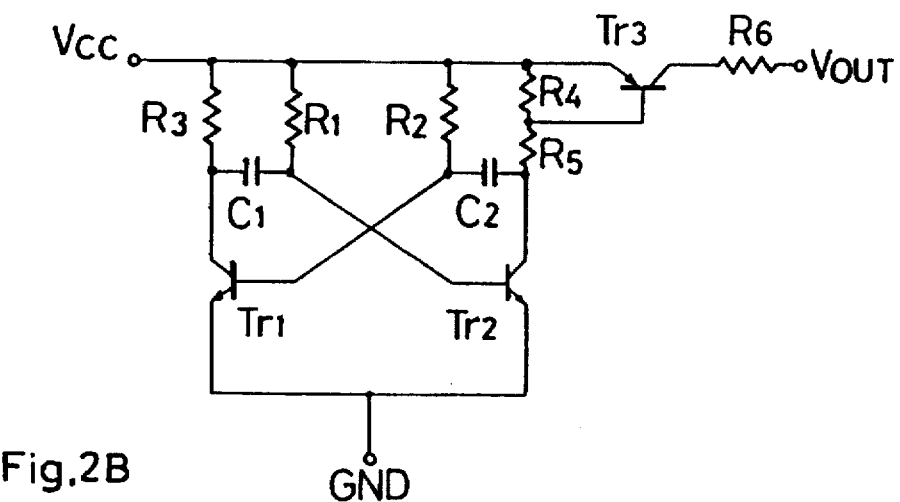
FIGS. 2A and 2B are a circuit diagram of a discharge controller, and a time chart showing its operation.
Figure 2B:
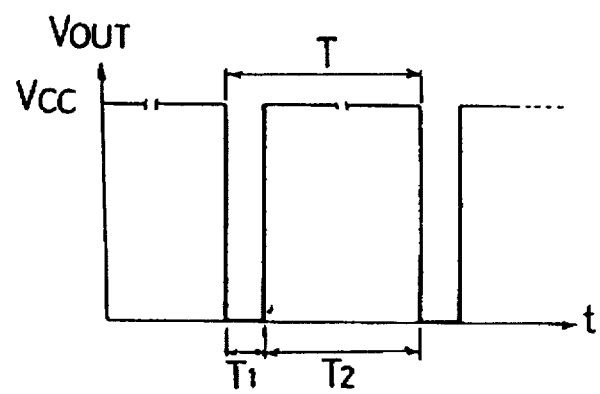
Figure 3A:
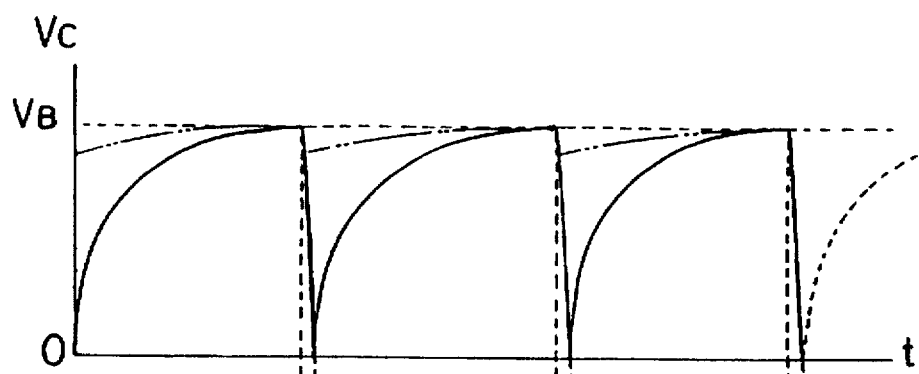
FIGS. 3A and 3B are time charts of the battery system.
Figure 3B:
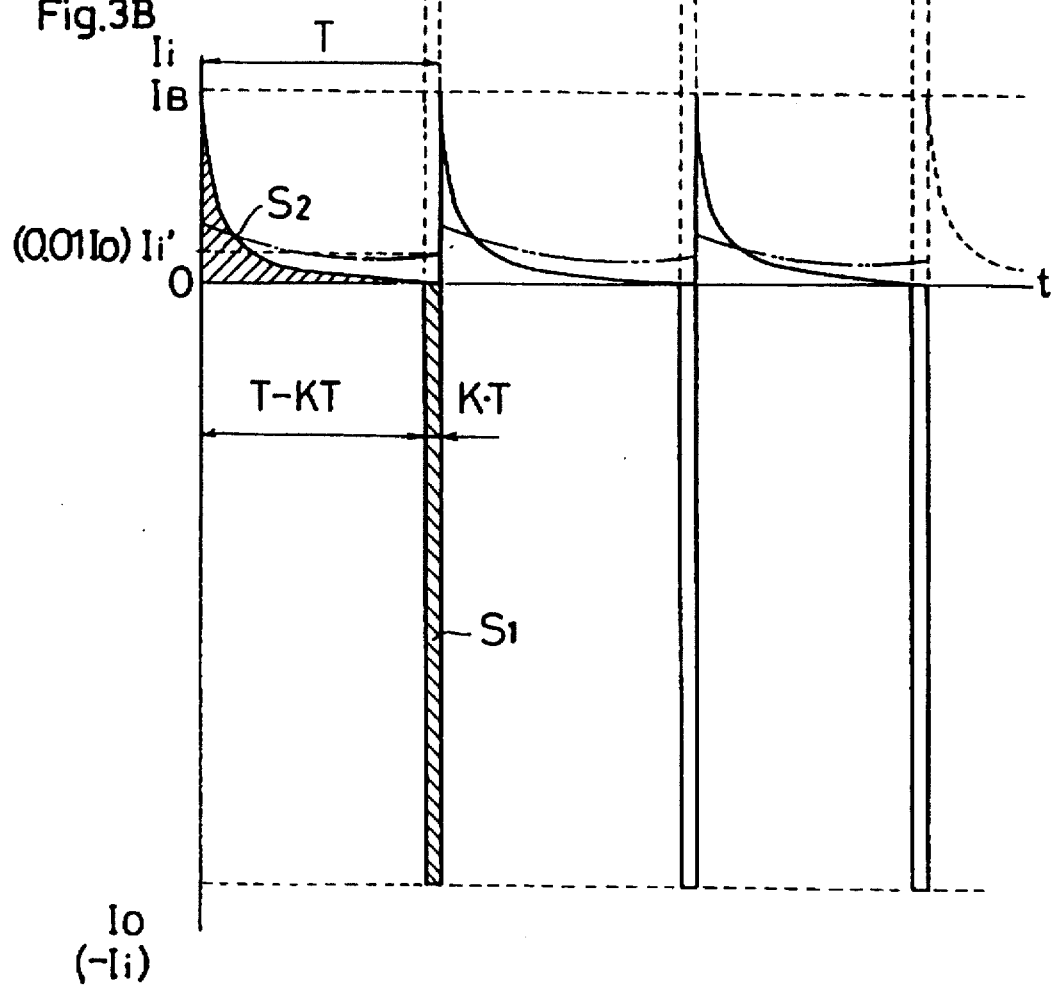

FIG. 1 is a circuit diagram of a battery system in a first embodiment of the invention. FIG. 2A is a circuit diagram of a discharge controller. FIG. 2B is a time chart showing operation of the discharge controller. FIGS. 3A and 3B are time charts showing operation of the battery system.

Referring to FIG. 1, numeral 1 denotes a primary or secondary battery having a positive terminal connected through a limiting resistor 2 to one end of an electric double layer capacitor 3 and to a source line $V_{CC}$ of a discharge controller 4 described later. It is assumed here that the battery 1 supplies discharge current $I_B$, and that potential $V_C$ is given to a connection between the limiting resistor 2 and electric double layer capacitor 3 (i.e. source line $V_{CC}$ of the discharge controller 4). The negative terminal of battery 1 is connected to the other end of electric double layer capacitor 3 and to a grounding line GND of discharge controller 4. A load L is connected between an output line $V_{OUT}$ and grounding line GND of discharge controller 4. The discharge controller 4 controls current (discharge current) Io supplied from the electric double layer capacitor 3 to the load L.

Next, reference is made to FIG. 2A showing a circuit diagram of discharge controller 4. This discharge controller 4 includes an astable multivibrator (which is the self-driven type to provide a square-wave output) having resistors $R_1$ and $R_5$, a capacitor $C_1$, a transistor $Tr_2$, resistors $R_2$ and $R_3$, a capacitor $C_2$ and a transistor $Tr_1$; a current booster circuit having a resistor $R_4$ and a transistor $Tr_3$ for boosting the output of the astable multivibrator; and a resistor $R_6$ for limiting the current supplied to the load L connected to the output line $V_{OUT}$. The discharge controller 40 may include one of various other types of square wave output circuit, instead of being limited to the astable multivibrator, as long as it is capable of driving the load in cycles. It is possible to employ an oscillating circuit with a C-MOS inverter, for example.

FIG. 2B shows an example of square waves outputted to the output line $V_{OUT}$ of discharge controller 4 constructed as above. In FIG. 2B, reference T represents each cycle of the square-wave output. Reference $T_1$ represents a period of time in which the transistor $Tr_3$ of the current booster circuit is placed in conductive state for supplying current to load L (load driving period). Reference $T_2$ represents a period of time in which the transistor $Tr_3$ of the current booster circuit is placed in non-conductive state for supplying no current to load L (load non-driving period). As is well known, approximate values of load driving period $T_1$, load non-driving period $T_2$ and load driving cycle T are derived from the following equations:

load driving period $T_1$=0.69 $C_2$ $R_2$ load non-driving period $T_2$=0.69 $C_1$ $R_1$ load driving cycle $T=T_1+T_2$ Constants are set for the discharge controller 4 such that load driving period $T_1$ is shorter than load non-driving period $T_2$. For example, load driving period $T_1$ is 1% of (duty ratio K) of cycle T. Assuming, for example, that load driving cycle T is 1 sec. (i.e. charging time), then load driving period $T_1$ is 0.01 sec. (=K·T), and load non-driving period $T_2$ is 0.99 sec. Such instantaneous charging and discharging as in charging time T (=1 sec.) are impossible with a secondary battery such as an Ni-Cd storage battery. It is only possibly by employing the electric double layer capacitor 3 capable of charging and discharging in a short time. This double layer capacitor 3 performs charging and discharging through adsorption/desorption of electric charge to/from activated carbon, and can therefore be used repeatedly without deterioration.

Next, reference is made to FIGS. 3A and 3B. FIG. 3A shows a time chart of voltage Vc at the opposite ends of double layer capacitor 3. FIG. 3B shows a time chart of charge current Ii for the double layer capacitor 3, and load current Io (discharge current) supplied to the load L.

Voltage Vc at the double layer capacitor 3 is variable by the discharge controller 4 as shown in solid lines in FIG. 3A. However, voltage Vc is smoothed by the limiting resistor 2 and electric double layer capacitor 3 to vary as shown in two-dot-and-dash lines. Further, as shown in solid lines in FIG. 3B, charge current Ii for the electric double layer capacitor 3 decreases from a peak provided by the discharge current $I_B$ from the battery 1. However, charge current Ii actually is also smoothed to vary as shown in two-dot-and-dash lines. The charge characteristic (electric energy charged) is expressed by the following equation, where the double layer capacitor 3 has capacitance C (F), the charging time is T (sec.), and charge current Ii has an average value Ii' for charging time T. The collector resistances $R_3$ and $R_5$ of transistors $Tr_1$ and $Tr_2$ are set to large values so that current consumption by the discharge controller 4 is sufficiently small and negligible compared with discharge current Io.

$$C \cdot V_B = Ii' \cdot T \quad (1)$$

The discharge characteristic (electric energy discharged) is expressed by the following equation:

$$C \cdot V_B = Io \cdot K \cdot T \quad (2)$$

Assuming that capacitance C of double layer capacitor 3 and voltage $V_B$ of battery 1 are invariable with repeated charging and discharging, the electric energy charged and electric energy discharged are equal. Thus, the following equation is obtained from equations (1) and (2):

$$Ii' \cdot T = Io \cdot K \cdot T \therefore Ii' = Io \cdot K \quad (3)$$

Substituting duty ratio K=0.01 (1%) into equation (3), Ii'=0.01·Io. Thus, it is seen that the average value Ii' of charge current is 1/100 times the current Io supplied to the load L (multiplied by duty ratio K). The electric energy for charging the electric double layer capacitor 3 (charging time X charge current) and the electric energy discharged therefrom (discharging time X discharge current) are equal. Consequently, the time for charging the electric double layer capacitor 3 may be extended by shortening the discharging time of the electric double layer capacitor 3. It is therefore possible to extend the time for the battery 1 to charge the electric double layer capacitor 3, i.e. the discharging time of battery 1. This allows the discharge current $I_B$ of battery 1 to be small.

Voltage Vc at the opposite ends of double layer capacitor 3 increases with a time constant based on the limiting resistor 2 and its own capacitance, substantially to reach output voltage $V_B$ of battery 1 (strictly speaking, lower by the voltage drop at the limiting resistor 2). Charge current Ii at this time decreases from output current $I_B$ of battery 1 forming a peak. The electric energy charged into the electric double layer capacitor 3, i.e. the electric energy discharged from the battery 1, is expressed by equation (1), and by area $2 in FIG. 3B. Further, the average value Ii' of charge current Ii is shown in FIG. 3B. The actual voltage Vc at the opposite ends and discharge current Ii are smoothed by the limiting resistor 2 and electric double layer capacitor 3 as shown in the two-dot-and-dash lines in FIG. 3B.

Upon lapse of load non-driving period $T_2$ (=T−K·T), the transistor $Tr_3$ of discharge controller 4 becomes "on" state to supply discharge current Io from output line $V_{OUT}$ to load L. This discharge current Io is 100 times the average charge current Ii', based on equation (3). The electric energy discharged from the electric double layer capacitor 3 may be expressed by area S1 in FIG. 3B. Upon lapse of load driving period $T_1$ (=K·T), charging of double layer capacitor 3 by the battery 1 and discharging from double layer capacitor 3 to load L are repeated.

As described above, the load L receives the electric energy supply not directly from the battery 1, but through the limiting resistor 2 and electric double layer capacitor 3. The limiting resistor 2 and double layer capacitor 3 smooth the discharge current $I_B$ from the battery 1, thereby significantly reducing the substantial discharge current Ii' of battery 1 (which is discharge current Io from the electric double layer capacitor 3 multiplied by duty ratio K) to lighten the load falling on the battery 1.

Figure 4:
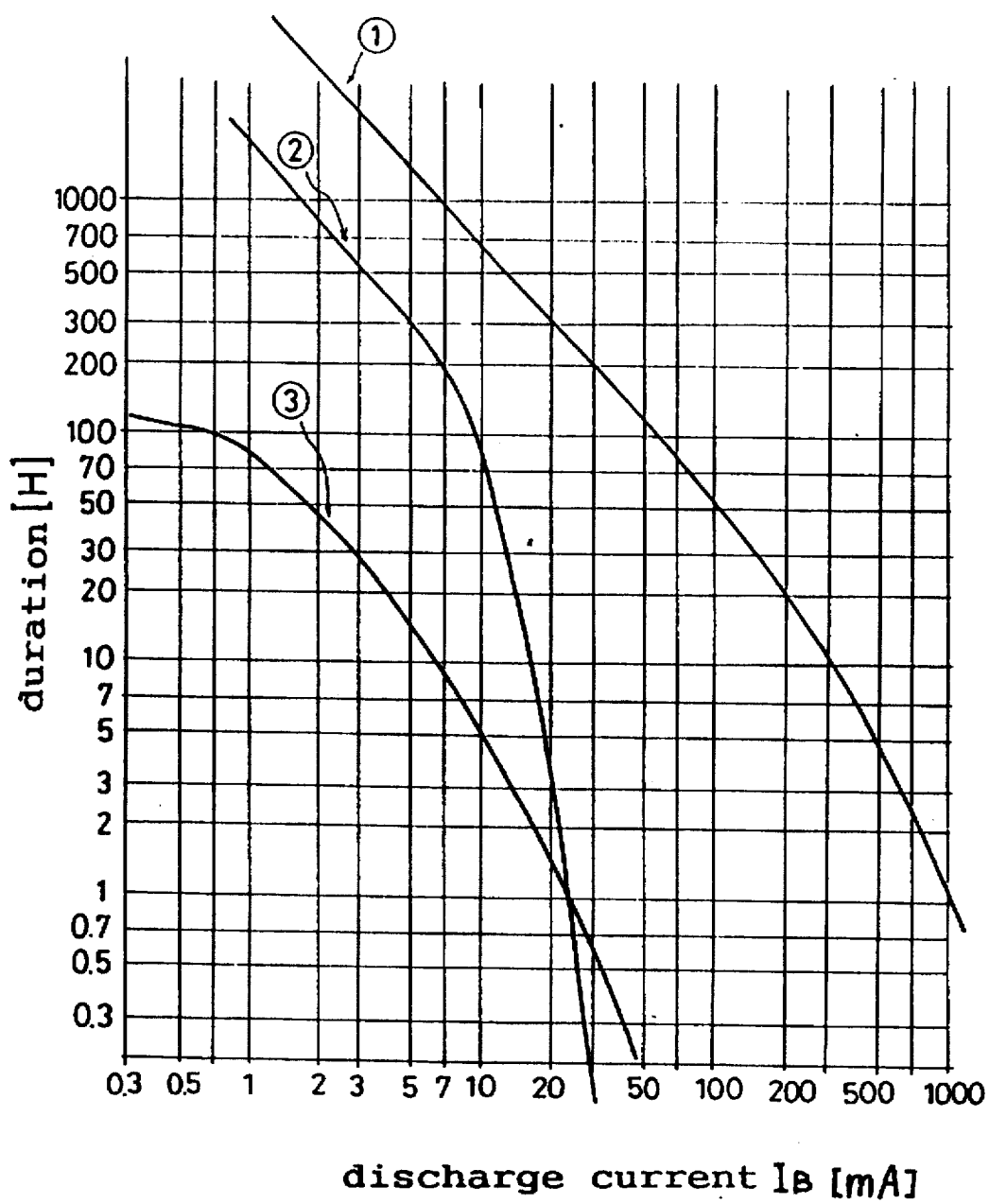
FIG. 4 is a characteristic view showing discharge electric currents and durations of various batteries.

A comparison is made hereinafter between the system of this invention and a conventional system with reference to FIG. 4 which is a characteristic view showing discharge currents and durations of various batteries. In FIG. 4, reference 1 in a circle indicates characteristics of a manganese primary battery, reference 2 in a circle those of a lithium primary battery, and reference 3 in a circle those of a lithium secondary battery. Assuming, for example, that the manganese primary battery referenced 2 in a circle is used, which provides 1A (1000 mA) discharge current Io to load L in the conventional system, with load L intermittently driven at 1% duty ratio K, then with discharge current Io (=1000 mA) directly taken out of the battery, the duration of discharge current Io is one hour, and duration $T_p$ for allowing the load to operate intermittently is 100 hours which is one hour divided by duty ratio K (=0.01). In the system embodying this invention, the discharge current from the electric double layer capacitor is 1000 mA, but discharge current Ii' (=$I_B$) from the battery is multiplied by its duty ratio K (1/100 times) to become 10 mA. Thus, the duration $T_I$ is 700 hours which are seven times that of the conventional system. If the duration is equal, then the battery capacity may be ⅐.

Figure 5:
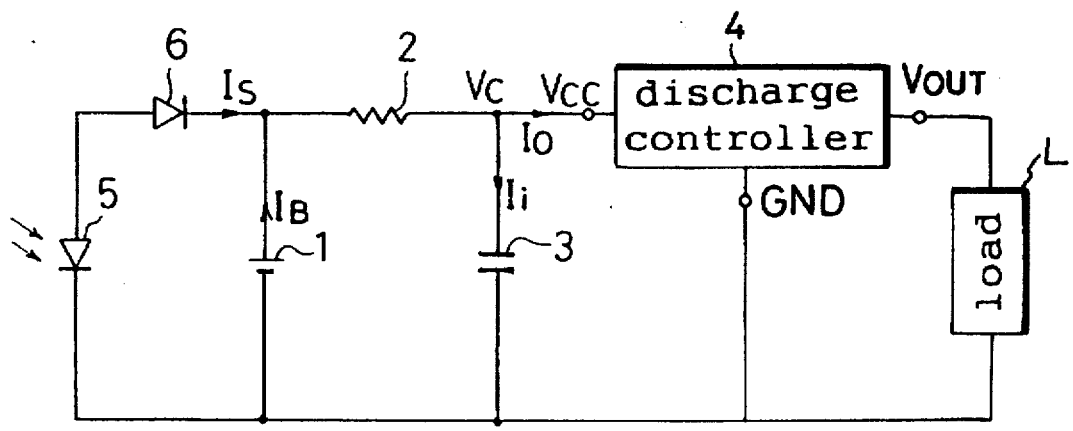
FIG. 5 is a circuit diagram of a battery system in a second embodiment.

FIG. 5 is a circuit diagram of a battery system in a second embodiment of the invention. In FIG. 5, like references are used to identify like parts in the first embodiment and will not be described again.

Numeral 5 denotes a solar battery having a positive terminal connected to a positive terminal of a secondary battery 1 through a reverse current preventive diode 6. When the solar batter 5 is irradiated with light, voltage $V_S$ is generated at opposite ends thereof, and current $I_S$ is made available then. When light irradiates the solar battery 5, this circuit starts charging the secondary battery 1 substantially with current $I_S$, which continues until voltage $V_B$ at opposite ends thereof equalizes voltage $V_S$. Further, the secondary battery 1 is charged by the solar battery 5 when the voltage $V_B$ at the opposite ends of the secondary battery 1 falls below voltage $V_S$.

Preferably, the reverse current preventive diode 6 comprises a schottky diode, for example, which has a minimum forward voltage, so that the voltage $V_S$ generated by the solar battery 5 is maintained as high as possible.

In this embodiment, as in the first embodiment, the time for charging the electric double layer capacitor 3 by the secondary battery 1 may be extended by shortening the discharging time of the double layer capacitor 3. It is therefore possible to extend the time for the secondary battery 1 to charge the electric double layer capacitor 3, i.e. the discharging time of the secondary battery 1. This allows the discharge current of secondary battery 1 to be small, and reduces the depth of discharge of the secondary battery 1 (relating to the ratio of discharge current to the nominal capacity of the secondary battery). Consequently, the cycle times of the secondary battery (the number of times the secondary battery is used in charging and discharging) may be increased.

As described above, the load L receives the electric energy supply not directly from the secondary battery 1, but through the limiting resistor 2 and electric double layer capacitor 3. The limiting resistor 2 and double layer capacitor 3 smooth the discharge current $I_B$ from the secondary battery 1, thereby significantly reducing the substantial discharge current Ii' (i.e. reducing the depth of discharge) of the secondary battery 1 (which is discharge current Io from the electric double layer capacitor 3 multiplied by duty ratio K) to lighten the load falling on the secondary battery 1.

Assuming that discharge current Io to the load L is 50 mA, and that duty ratio K is 5%;

$$I_B = Ii = 50\ mA \times 0.05 = 2.5\ mA.$$

Where the load is driven for 12 hours a day (hours being hereinafter represented by H), the capacity required of the secondary battery 1 is expressed by the following equation:

$$2.5\ mA \times 12\ H/day = 30\ mAH/day.$$

Where the depth of discharge is 10%, the capacity required of secondary battery 1 is expressed by the following equation:

$$30\ mAH/0.1 = 300\ mAH.$$

Where the loss factor of solar battery 5 is 0.6 and sunlight hours are 3 H, the output ($I_S$) of solar battery 5 is expressed by the following equation:

$$30\ mAH/(3\ H + 0.6) = 8.33\ mA.$$

This is multiplied by about 10, considering charging in rainy weather. Thus, the solar battery 5 may provide an output $I_S$ of 83.3 mA.

A comparison is made between the system of this invention and the conventional system with reference to FIG. 4 which is the characteristic view showing discharge currents and durations of various batteries. The secondary battery 1 in this embodiment is the lithium secondary battery at reference 3 in a circle.

The secondary battery 1 in this embodiment provides discharge current $I_B$ of 2.5 mA, and its duration $T_1$ derived from FIG. 4 is about 35 H. Thus, the capacity of one secondary battery 1 is 2.5 mA×35 H=87.5 mAH. The capacity of secondary battery 1 needed to drive the load L for 12 H a day is 300 mAH (depth of discharge: 10%). The number of secondary batteries is 300 mAH/87.5 mAH=3.4. Thus, it is adequate to arrange four secondary batteries connected in parallel.

In the conventional system, on the other hand, $I_B$=50 mA, and the duration of discharge from the secondary battery 1 derived from FIG. 4 is about 0.2 H. The duration of discharge $T_p$ with the duty ratio K=5% is 0.2 H/0.05=4 H. Thus, the capacity of one secondary battery 1 is 50 mA×0.05×4 H=10 mAH. The capacity of secondary battery 1 needed to drive the load L for 12 H a day is 300 mAH. The number of secondary batteries is 300 mAH/10 mAH=30. Thus, it is necessary to arrange as many as 30 secondary batteries connected in parallel.

Figure 6:
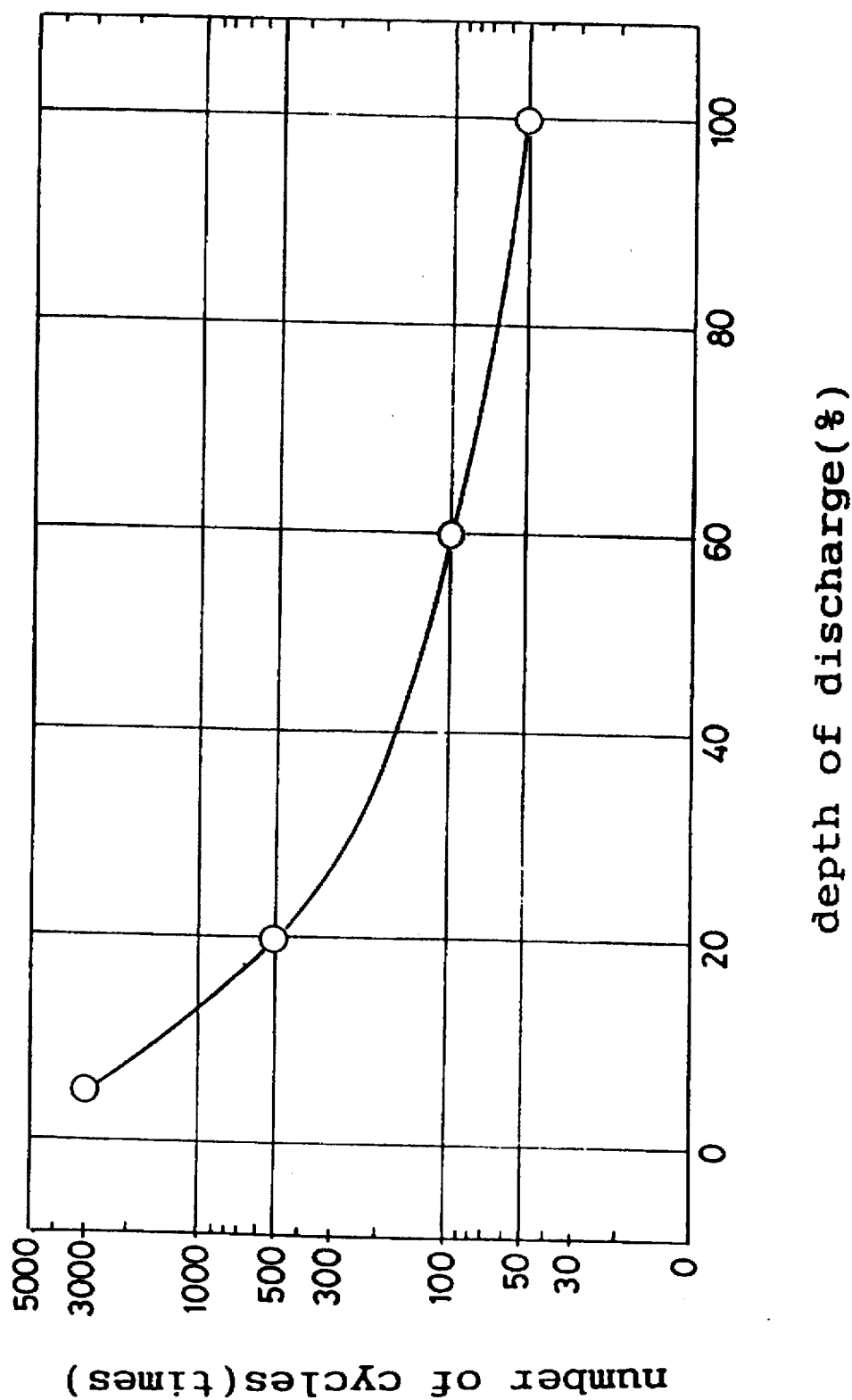
FIG. 6 is a characteristic view showing depths of discharge and cycle times of a secondary battery.

Next, reference is made to FIG. 6 which is a characteristic view showing depths of discharge and cycle times. A secondary battery normally has a depth of discharge at 30 to 50%, and hence the number of cycles is approximately 100 to 300. In this embodiment, the depth of discharge is set to 10%. Thus, based on FIG. 4, the number of cycles is approximately 1000, which is about three to ten times the number of cycles at the greater depth of discharge (30 to 50%). By reducing the depth of discharge below 10%, it is possible to obtain approximately 3000 cycle times. That is, the life of the secondary battery may be extended. In a battery system where a secondary battery is charged by a solar battery, and electric energy is supplied from the secondary battery charged to a load to operate the load, the secondary battery normally has a capacity for covering 10 to 20 days to compensate for sunless weather. Thus, the system inevitably requires a large secondary battery. However, where the number of cycles is in the order of several thousand, charging and discharging may be effected on a daily basis. It is unnecessary to compensate for sunless weather, and hence the secondary battery may have a reduced capacity. Consequently, a small secondary battery is adequate. Further, an all-weather battery system may be realized by setting the output current of the solar battery in a rainy condition.

Figure 7:
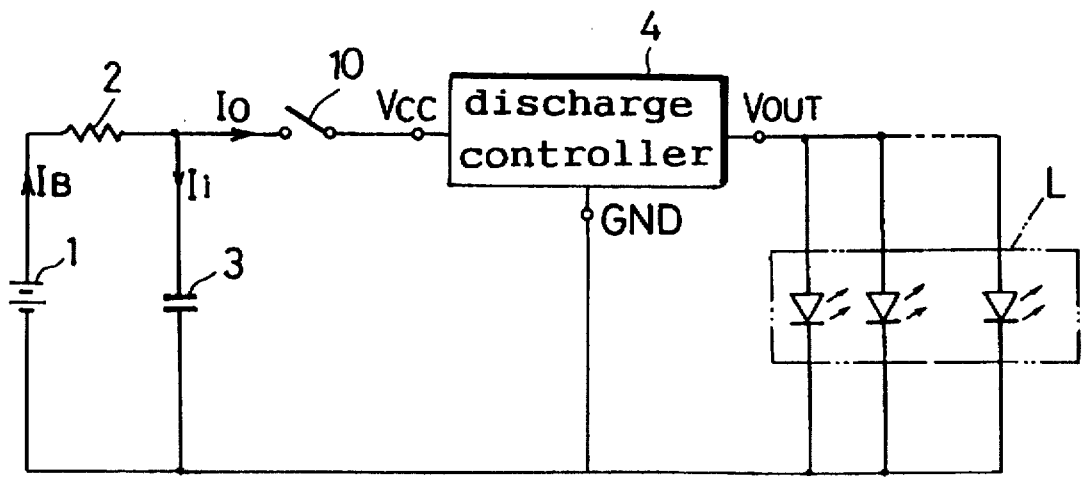
FIG. 7 is a circuit diagram of a signal/guide light in a third embodiment.
Figure 8:
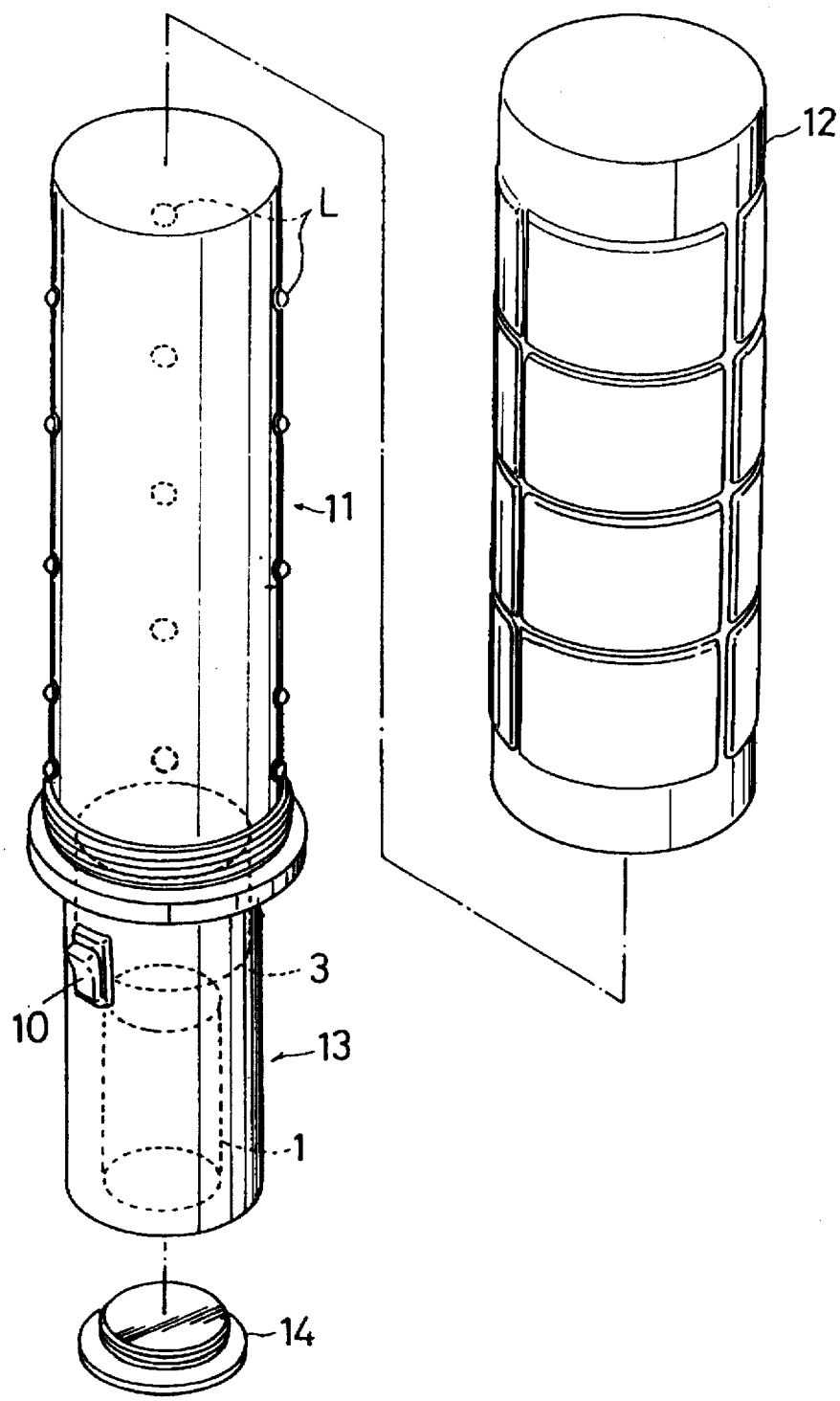
FIG. 8 is a perspective view of the signal/guide light.

A signal/guide light will be described hereinafter in accordance with a third embodiment of the invention, which is one example of intermittent motion apparatus utilizing the battery system described in the first embodiment. FIG. 7 is a circuit diagram of the signal/guide light, and FIG. 8 is a perspective view showing an outward appearance of the signal/guide light. The signal/guide light is an apparatus for alerting motorists to road works or the like or indicating a course to follow at nighttime, and employs light emitting diodes or the like which brink to draw attention.

In FIG. 7, numeral 10 denotes a switch for starting and stopping the supply of electric energy from the electric double layer capacitor 3 to the discharge controller 4 and load L. This switch 10 is closed or opened to make or break the supply of electric energy to the controller 4 and load L. The load L in this signal/guide light includes 15 light emitting diodes arranged in parallel to act as a light emitting device. This signal/guide light has a power source consisting of two AA-size manganese primary batteries connected in series. The discharge controller 4 is, byway of example, set to cycle T=0.1 sec. and duty ratio K=20%.

Referring to FIG. 8, the signal/guide light includes an indicator 11 formed on an upper portion thereof for drawing attention of motorists and the like. The indicator 11 has the 15 light emitting diodes (load L) arranged peripherally thereof. A protective cover 12 is screwed onto the indicator 11 to protect the light emitting diodes L from raindrops and the like. The protective cover 12 defines an uneven outer surface for scattering light emitted from the light emitting diodes L. The signal/guide light further includes a grip 13 disposed below the indicator 11 for allowing the user to hold the light in his or her hand. The grip 13 includes a watertight cap 14 mounted on a bottom surface thereof for allowing the battery 1 to be inserted. The switch 10 of the signal/guide light is disposed on an upper peripheral position of the grip 13.

The load L (with the 15 light emitting diodes connected in parallel) of this signal/guide light consumes a current of 1000 mA. That is, discharge current Io=1000 mA. With the duty ratio K=0.2 (20%), the current $I_B$ of battery 1 is 200 mA based on equation (3). Thus, from the characteristic view in FIG. 4 showing discharge electric currents and durations, the duration $T_1$ of battery 1 of this signal/guide light is 20 H.

In a conventional signal/guide light, the current $I_B$ of battery 1 is 1000 mA, and therefore its duration is 1 H. With the duty ratio K=0.2, the duration $T_p$ of battery 1=1 H/0.2=5 H. Thus, the signal/guide light in this embodiment provides a duration (=$T_1/T_p$) four times that of the conventional signal/guide light. Where the operating time is the same, the capacity of battery 1 may be reduced to ¼.

When the battery acting as the power source runs down at night, the signal/guide light cannot attract motorists' attention. This results in a serious danger to both people at work and motorists. Thus, whether the battery currently in use has a sufficient capacity or not, the battery is always replaced with a new one before use to be on the safe side. The battery replaced is discarded, which poses a problem of adversely influencing environment. According to this embodiment, however, the battery has an extended life, four times that of the conventional system, which is an economic advantage.

Figure 9:
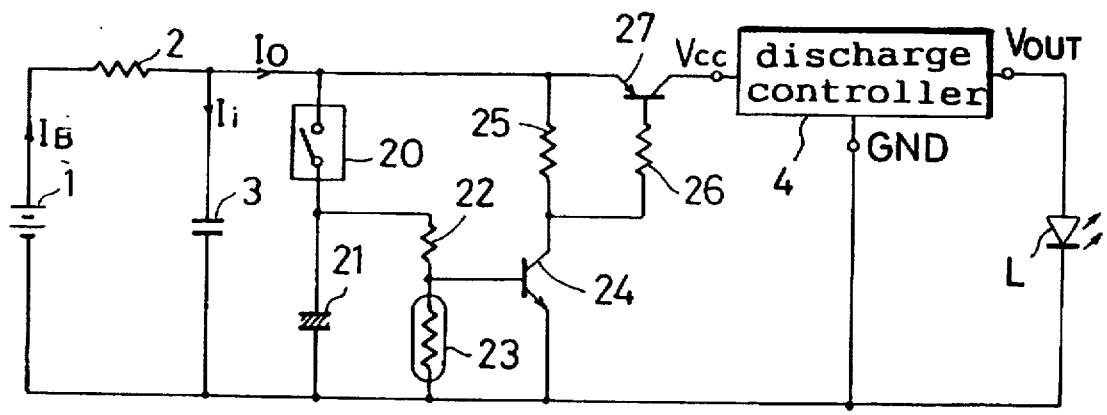
FIG. 9 is a circuit diagram of a bicycle safety light in a fourth embodiment.
Figure 10:
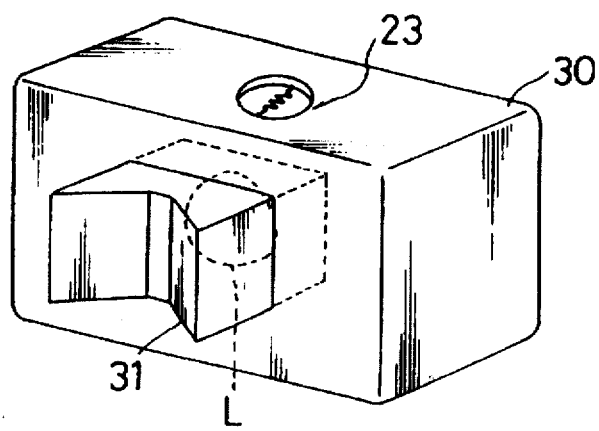
FIG. 10 is a perspective view of the bicycle safety light.

A bicycle safety light will be described in accordance with a fourth embodiment of the invention, which is another example of intermittent motion apparatus utilizing the battery system described in the first embodiment. FIG. 9 is a circuit diagram of the bicycle safety light, and FIG. 10 is a perspective view showing an outward appearance of the bicycle safety light. The bicycle safety light is an apparatus mounted on the saddle or rear fender of a bicycle to assure safety when running at nighttime.

Referring to FIG. 9, one end of a vibration sensor 20 is connected to the positive terminal of electric double layer capacitor 3, and one end of an electrolytic capacitor 21 is connected to the other end of vibration sensor 20. The other end of electrolytic capacitor 21 is connected to the grounding line GND of discharge controller 4. The vibration sensor 20 may be one of various types. In this embodiment, the vibration sensor 20 includes a pivotable electrode and a fixed electrode, the pivotable electrode having one end thereof fixed and the other end carrying a weight. This vibration sensor 20 corresponds to the vibration detecting device of the present invention.

A resistor 22 and a photoconductive cell 23 acting as a light detecting device are connected in series to a connection between the vibration sensor 20 and electrolytic capacitor 21. Typically, the photoconductive cell 23 is a CdS (cadmium sulphide) or CdTe cell, which is an optical sensor having a resistance variable with light irradiation. While the photoconductive cell 23 may comprise one of various types, a CdS cell is preferred for the purpose of detecting sunset since its spectral response characteristics are close to visual sensitivity characteristics. The base terminal of a transistor 24 is connected to a connection between the resistor 22 and photoconductive cell 23. The collector terminal of transistor 24 is connected to the positive terminal of electric double layer capacitor 3 through a resistor 25. The emitter terminal of transistor 24 is connected to the grounding line GND of discharge controller 4. Further, the collector terminal of transistor 24 is connected to the base terminal of a transistor 27 through a resistor 26. The emitter terminal of transistor 27 is connected to the positive terminal of electric double layer capacitor 3. The collector terminal of transistor 27 is connected to the source line $V_{CC}$ of discharge controller 4. A light emitting diode L acting as a light emitting device is connected to the output terminal $V_{OUT}$ of discharge controller 4. A forward current of 50 mA, for example, is supplied intermittently to the light emitting diode L. Various constants are set to the discharge controller 4 to provide cycle T=0.5 sec. and duty ratio K=0.05 (5%).

With this bicycle safety light, the light emitting diode L is lit intermittently only when both the vibration sensor 20 and photoconductive cell 23 operate at the same time. That is, the electrolytic capacitor 21 is connected to the positive terminal of electric double layer capacitor 3 when the vibration sensor 20 detects vibration. Then, the electric double layer capacitor 3 charges the electrolytic capacitor 21, and the current flows to the resistor 22 and photoconductive cell 23. In a daylight condition, the transistor 24 does not become conductive since the photoconductive cell 23 has a resistance in the order of several hundred ohms. After sunset, the resistance of photoconductive cell 23 becomes several hundred kilo ohms to place the transistor 24 in conductive state. With the transistor 24 becoming conductive, a current flows through the resistor 25 to render the transistor 27 conductive. With the transistor 27 becoming conductive, the discharge controller 4 operates to drive the light emitting diode L intermittently.

The electrolytic capacitor 21 is connected parallel to the resistor 22 and photoconductive cell 23. Therefore, when the bicycle stops at traffic lights at nighttime, that is when the vibration sensor 20 becomes inoperative, the electric energy stored in the electrolytic capacitor 21 flows to the resistor 22 and photoconductive cell 23 to maintain the transistor 24 conductive for a time corresponding to its capacitance. Thus, safety is assured also when the cyclist waits at traffic lights at nighttime.

Figure 11:
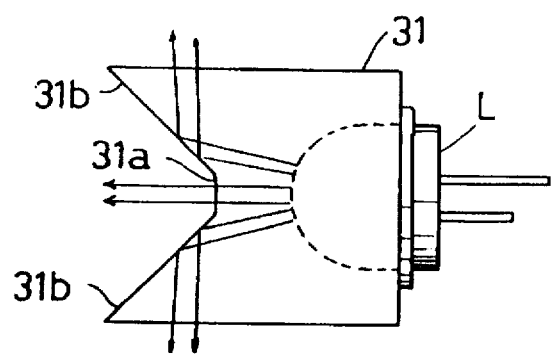
FIG. 11 is a plan view of a diffuser lens.

Referring to FIG. 10, the photoconductive cell 23 is disposed on an upper surface of a main body 30 of the bicycle safety light. The light emitting diode L is mounted in a front position of the main body 30, with a light diffuser lens 31 formed of a resin having a high refractive index. As shown in plan in FIG. 11, the light diffuser lens 31 is centrally recessed at one end thereof to define two slant surfaces 31b extending toward a bottom 31a. The light emitting diode L is embedded in the other end of the lens 31 to be opposed to the bottom 31a. Light (indicated by arrows in FIG. 11) radiating from the light emitting diode L embedded in the light diffuser lens 31 mainly travels forward through the bottom 31a, with part thereof reflected by the slant surfaces 31b to travel sideways from the light diffuser lens 31. Consequently, where the main body 30 of the bicycle safety light having the diffuser lens 31 is mounted on the rear fender or saddle of the bicycle, visibility is increased sideways as well as rearward to secure safety.

A bicycle safety light usually has a power switch mounted on the handlebar or on the safety light itself for operating and stopping the light. In this case, the cyclist often forgets to turn off the switch, thereby to deplete the battery. Thus, most cyclists ride bicycles without turning on the power switch, which is dangerous. However, with the bicycle safety light in this embodiment, the photoconductive cell 23 detects a dark condition at nighttime or during the day, and the vibration sensor 20 detects use of the bicycle, to dispense with the trouble of turning on a power switch. In the absence of a power switch, an inconvenience is avoided in which the cyclist forgets to turn off the power switch, with the result that the battery is down when needed.

To make the bicycle safety light small and light-weight, the battery 1 may comprise, for example, a lithium primary battery (referenced 2 in FIG. 4) which is small and is the high density type. The period for which this battery is available for use is now calculated. It is assumed that the light emitting diode L consumes a current of 50 mA, that the discharge controller 4 provides cycle T of 0.5 sec. and that the duty ratio K is 0.05 (5%). Then, the charge current Ii for the electric double layer capacitor 3 (discharge current $I_B$ from the battery 1) is derived from the following equation:

$$Ii = 50\ mA \times 0.05 = 2.5\ mA$$

From reference 2 in FIG. 4, the duration $T_I$ of the lithium primary battery is 700 H. Thus, where the bicycle safety light is used at the rate of 15 min. a day, and the battery 1 makes zero self-discharge, the battery is available for use for as long as about eight years (700 H×60 min./15=2800 days).

Next, the same calculation will be made for the conventional system. The battery 1 has discharge current $I_B$ of 50 mA, and therefore its duration cannot be derived from the characteristic view of FIG. 4, reference 2. This indicates that a lithium primary battery cannot be used with such a large current. Assuming an extension of the characteristic view of FIG. 4, its duration is about 0.1 H. The light emitting diode L is lit with duty ratio K=0.05, and therefore the duration $T_p$ is 2 H (=0.1 H/0.05). Thus, this embodiment has an advantage of extended life which is 350 times (=700 H/2 H) that of the conventional system.

Figure 12:
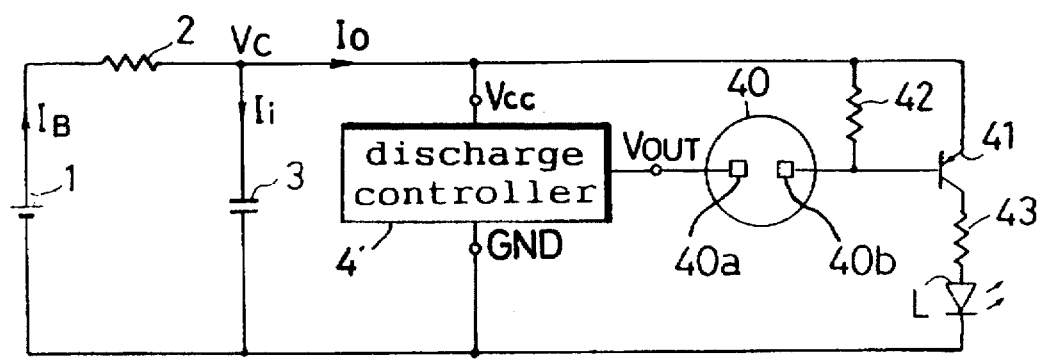
FIG. 12 is a circuit diagram of an underwater fishing light in a fifth embodiment.
Figure 13:
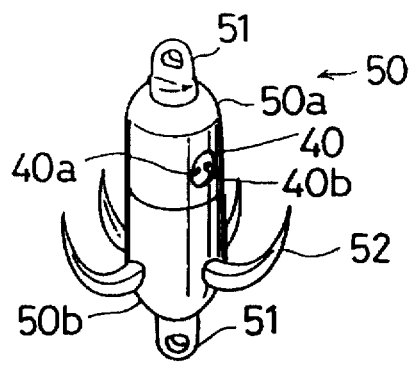
FIG. 13 is a perspective view of the underwater fishing light.

An underwater fishing light will be described hereinafter in accordance with a fifth embodiment of the invention, which is a further example of intermittent motion apparatus utilizing the battery system described in the first embodiment. FIG. 12 is a circuit diagram of the underwater fishing light, and FIG. 13 is a perspective view showing an outward appearance of the underwater fishing light. The underwater fishing light is a brinkable light for attracting fish living in relatively deep levels (about 100 m deep), such as squids, cutlass fish and congers.

Referring to FIG. 12, a discharge controller 4' has the circuit shown in FIG. 2A from which the current booster circuit (transistor $Tr_3$ and resistor $R_6$) is excluded and in which the connection between resistor $R_4$ and resistor $R_5$ acts as output terminal $V_{OUT}$. A seawater sensor 40 acting as a seawater detecting device has one end 40a thereof connected to the output terminal $V_{OUT}$ of the discharge controller 4'. The other end 40b of seawater sensor 40 is connected to the positive terminal of electric double layer capacitor 3 through a bias resistor 42 of a transistor 41, and to the base terminal of transistor 41. The emitter terminal of transistor 41 is connected to the positive terminal of electric double layer capacitor 3. The collector terminal of transistor 41 is connected to a light emitting diode L acting as a light emitting device, through a current limiting resistor 43.

Various constants are set to the discharge controller 4' to provide cycle T=0.2 sec. and duty ratio K=0.05 (5%). The current limiting resistor 43 has a value for providing a forward current of 50 mA for the light emitting diode L.

The seawater sensor 40 has electrodes 40a and 40b which are each approximately 5 mm square in size, and are arranged at an interval of about 5 mm. The electrodes 40a and 40b are arranged to contact seawater, and therefore preferably are given treatment to withstand corrosion in advance in order that their resistance would not vary with corrosion. The resistance between electrodes 40a and 40b of seawater sensor 40 is about 10 kilo ohms in seawater, and about 1 mega ohm in air. Further, the resistance therebetween is about 100 kilo ohms when contacted by water such as rainwater instead of seawater. Thus, the resistance of seawater sensor 40 falls only in seawater to cause electric current to flow through the bias resistor 42 to place the transistor 41 in conductive state.

Referring to FIG. 13, the underwater fishing light 50 includes an upper portion 50a and a lower portion 50b (the latter being formed of a material for transmitting light from the light emitting diode L), each having a fishing line connector 51 at an end thereof. The battery 1, electric double layer capacitor 3, discharge controller 4' and seawater sensor 40 are mounted in the upper portion 50a. The seawater sensor 40 is disposed on a side surface of the upper portion 50a, with the electrodes 40a and 40b exposed to seawater. The lower portion 50b includes four fish hooks 52 arranged peripherally thereof and Symmetrically in plan view. The light emitting diode L is mounted in the lower portion 50b.

Figure 14:
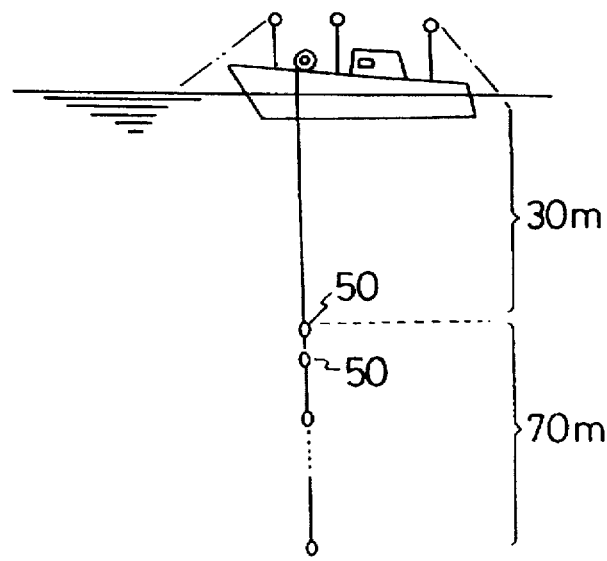
FIG. 14 is an explanatory view showing use of the underwater fishing light.

As shown in FIG. 14, 70 underwater fishing lights 50 are connected to fishing lines at intervals of 1 m, for example. These fishing lights 50 are suspended from a fishing vessel into seawater, with an uppermost fishing light 50 lying at about 30 m below the fishing vessel. Since the seawater sensor 40 is operable only in seawater as noted above, the light emitting diode L brinks only when the underwater fishing light 50 is in seawater. Thus, the battery 1 is used slowly to economic advantage. A fishing operation using such underwater fishing lights usually continues for about 12 H. Further, since small lamps are used as light sources, batteries are changed for each operation. However, according to this embodiment, the light emitting diode L is used as the light source, and besides the discharge current of battery 1 can be reduced. Thus, consumption of battery 1 may be suppressed.

The duration of battery 1 comprising a lithium primary battery (referenced 2 in FIG. 4) is now calculated. The discharge current $I_B$ from the battery 1 is 2.5 mA (=50 mA×0.05) and, from FIG. 4, duration $T_l$ is 700 H. Thus, where an operation is carried out for 12 H per day, the battery is available for use for about 58 days (700 H/12 H=58.3) (about two months).

In the conventional system, the battery 1 has discharge current $I_B$ of 50 mA, and therefore its duration cannot be derived from the characteristic view of FIG. 4, reference 2. This indicates that the lithium primary battery cannot be used with such a large current. Assuming an extension of the characteristic view of FIG. 4, its duration is about 0.1 H. The light emitting diode L is lit with duty ratio K=0.05, and therefore the duration $T_p$ is 2 H (=0.1 H/0.05). Thus, this embodiment has an advantage of extended life which is 350 times (=700 H/2 H) that of the conventional system.

A pressure sensor may be connected in series to the seawater sensor 40, or a pressure sensor maybe used in place of the seawater sensor 40, to drive the light emitting diode L when the underwater fishing light 50 reaches a predetermined depth. A simple pressure sensor of the mechanical diaphragm type is preferred. Such a pressure sensor may include a conducting electrode formed on a side of the diaphragm not contacting seawater, and a pair of electrodes opposed to the conducting electrode and arranged at a predetermined interval therebetween. With this construction, the diaphragm is deformed when the underwater fishing light 50 reaches a predetermined depth, thereby moving the conducting electrode into contact with the pair of electrodes. Thus, the light emitting diode L is driven to brink when or only when the fishing light 50 reaches the predetermined depth in seawater. This provides the effect of further suppressing consumption of battery 1.

The third to fifth embodiments have been described, exemplifying a light emitting device such as the light emitting diode or diodes L acting as the load. However, the load may comprise, instead of the light emitting diode or diodes, one of various actuators or a sounding device operable intermittently.

The signal/guide light, bicycle safety light and underwater fishing light have been described as examples of the intermittent motion apparatus. The present invention is not limited to these lights, but is applicable to various other intermittent motion apparatus. Such apparatus include solar radios, transceivers, battery-operated lighters, pumps, sprinklers, electrically operated blinds, level crossing gates, and automatic doors.

The present invention may be embodied in other specific forms without departing from the spirit or essential attributes thereof and, accordingly, reference should be made to the appended claims, rather than to the foregoing specification, as indicating the scope of the invention.

What is claimed is:

1. A battery system for supplying electric energy from a primary battery or a secondary battery to a load, comprising:
    a battery consisting of said primary battery or said secondary battery;

an electric double layer capacitor for storing electric energy from said battery;

a limiting resistor for limiting the electric energy supplied from said battery to said electric double layer capacitor; and discharge control means for causing said electric double layer capacitor to discharge the electric energy to said load intermittently in predetermined cycles while charging said electric double layer capacitor, such that a discharging time for discharging the electric energy from said electric double layer capacitor to said load is shorter than a charging time for charging said electric double layer capacitor with electric energy and that a discharge current is greater than a charge current.

2. A battery system as defined in claim 1, wherein said discharge control means provides controls such that, where said discharging time is $T_1$, said charging time is $T_2$, and a sum thereof is a driving cycle T ($=T_1+T_2$) of said load, said discharging time T is 1% of said driving cycle T of said load (duty ratio K=0.01).

3. A battery system as defined in claim 1, wherein said battery comprises a secondary battery chargeable by a solar battery for converting light energy into electric energy.

4. A battery system as defined in claim 3, further comprising a reverse current preventive diode connected in series between said solar battery and said secondary battery.

5. A battery system as defined in claim 4, wherein said reverse current preventive diode comprises a schottky diode.

6. A battery system as defined in claim 3, wherein said discharge control means provides controls such that, where said discharging time is $T_1$, said charging time is $T_2$, and a sum thereof is a driving cycle T ($=T_1+T_2$) of said load, said discharging time T is 5% of said driving cycle T of said load (duty ratio K=0.05).

7. An intermittent motion apparatus for supplying electric energy from a primary battery or a secondary battery to a load to drive said load intermittently, said apparatus comprising:

a battery consisting of said primary battery or said secondary battery;

light emitting means such as a light emitting diode acting as said load;

an electric double layer capacitor for storing electric energy from said battery;

a limiting resistor for limiting the electric energy supplied from said battery to said electric double layer capacitor; and discharge control means for causing said electric double layer capacitor to discharge the electric energy to said light emitting means to drive said light emitting means intermittently in predetermined cycles while charging said electric double layer capacitor, such that a discharging time for discharging the electric energy from said electric double layer capacitor to said light emitting means is shorter than a charging time for charging said electric double layer capacitor with electric energy and that a discharge current is greater than a charge current.

8. An apparatus as defined in claim 7, wherein said apparatus is a signal/guide light including a tubular indicator having a plurality of light emitting diodes arranged peripherally thereof to act as said light emitting means, a grip disposed below said indicator and having said electric double layer capacitor, said limiting resistance and said discharge control means mounted therein, a switch disposed peripherally thereof for supplying and stopping the electric energy from said electric double layer capacitor to said discharge control means, and said battery mounted in a space closable by a watertight cap attached to a bottom thereof, and a protective cover for surrounding said indicator.

9. An apparatus as defined in claim 7, wherein said discharge control means provides controls such that, where said discharging time is $T_1$, said charging time is $T_2$, and a sum thereof is a driving cycle T ($=T_1+T_2$) of said light emitting means, said discharging time T is 20% of said driving cycle T (duty ratio K=0.2).

10. An apparatus as defined in claim 7, further comprising vibration detecting means for detecting vibration, and light detecting means for detecting ambient illuminance below a predetermined illuminance level, wherein said discharge control means is operable, only when said vibration detecting means and said light detecting means are both in operation, for causing said electric double layer capacitor to discharge the electric energy to said light emitting means to drive said light emitting means intermittently in predetermined cycles while charging said electric double layer capacitor, such that the discharging time for discharging the electric energy from said electric double layer capacitor to said light emitting means is shorter than the charging time for charging said electric double layer capacitor and that the discharge current is greater than the charge current.

11. An apparatus as defined in claim 7, wherein said apparatus is a bicycle safety light including a main body having a light emitting diode mounted in a front position thereof to act as said light emitting means, and a photoconductive cell disposed on an upper surface thereof to act as said light detecting means, said main body containing said electric double layer capacitor, said limiting resistor, said vibration detecting means and said discharge control means, and a light diffuser lens for forwardly and laterally diffusing light radiating from said light emitting diode.

12. An apparatus as defined in claim 11, wherein said photoconductive cell comprises a CdS (cadmium sulphide) cell.

13. An apparatus as defined in claim 11, further comprising an electrolytic capacitor connected to said electric double layer capacitor through said vibration detecting means, wherein said discharge control means is operable, when said vibration detecting means is inoperative and said light detecting means is operative, for causing said electric double layer capacitor to supply electric energy to said light emitting diode intermittently in predetermined cycles for a period according to a capacitance of said electrolytic capacitor.

14. An apparatus as defined in claim 11, wherein said light diffuser lens is centrally recessed at one end thereof to define two slant surfaces extending toward a bottom, said light emitting diode being embedded in the other end of said light diffuser lens to be opposed to said bottom.

15. An apparatus as defined in claim 10, wherein said discharge control means provides controls such that, where said discharging time is $T_1$, said charging time is $T_2$, and a sum thereof is a driving cycle T ($=T_1+T_2$) of said light emitting means, said discharging time T is 5% of said driving cycle T of said light emitting means (duty ratio K=0.05).

16. An apparatus as defined in claim 7, further comprising seawater detecting means for detecting presence/absence of seawater, wherein said discharge control means is operable, only when said seawater detecting means detects seawater, for causing said electric double layer capacitor to discharge the electric energy to said light emitting means to drive said light emitting means intermittently in predetermined cycles while charging said electric double layer capacitor, such that the discharging time for discharging the electric energy from said electric double layer capacitor to said light emitting means is shorter than the charging time for charging said electric double layer capacitor and that the discharge current is greater than the charge current.

17. An apparatus as defined in claim 16, wherein said discharge control means provides controls such that, where said discharging time is $T_1$, said charging time is $T_2$, and a sum thereof is a driving cycle T $(=T_1+T_2)$ of said light emitting means, said discharging time T is 5% of said driving cycle T of said light emitting means (duty ratio K=0.05).

18. An apparatus as defined in claim 16, wherein said seawater detecting means includes two electrodes each approximately 5 mm square in size and arranged at an interval of about 5 mm.

19. An apparatus as defined in claim 16, wherein said electrodes are given anticorrosion treatment.

20. An apparatus as defined in claim 16, wherein said apparatus is an underwater fishing light including an upper portion and a lower portion having said electric double layer capacitor, said limiting resistor, said seawater detecting means and said discharge control means mounted therein, and a fishing line connector formed at an upper end thereof, and a lower portion connected to said upper portion and having a light emitting diode mounted therein to act as said light emitting means, a plurality of fish hooks arranged peripherally thereof, and a fishing line connector formed at a lower end thereof.

* * * * *